US012768405B2

(12) United States Patent
Tarrajat et al.

(10) Patent No.: US 12,768,405 B2
(45) Date of Patent: Oct. 20, 2026

(54) CLAMPING DEVICE FOR A WIRE ELEMENT AND METHOD FOR CLAMPING A WIRE ELEMENT

(71) Applicant: ZEDEL, Crolles (FR)

(72) Inventors: Jules Tarrajat, Voiron (FR); Michael Chaumontet, Crolles (FR)

(73) Assignee: ZEDEL, Crolles (FR)

( * ) Notice: Subject to any disclaimer, the term of this patent is extended or adjusted under 35 U.S.C. 154(b) by 373 days.

(21) Appl. No.: 18/369,021

(22) Filed: Sep. 15, 2023

(65) Prior Publication Data

US 2024/0093737 A1 Mar. 21, 2024

(30) Foreign Application Priority Data

Sep. 19, 2022 (FR) ....................................... 2209402

(51) Int. Cl.
*A62B 35/00* (2006.01)
*F16D 63/00* (2006.01)

(52) U.S. Cl.
CPC ........ *F16D 63/008* (2013.01); *A62B 35/0075* (2013.01); *A62B 35/0093* (2013.01); *A62B 35/0081* (2013.01)

(58) Field of Classification Search
CPC .... F16D 59/00; F16D 59/02; F16D 2127/002; F16D 63/008; A62B 35/0093; A62B 1/10; A62B 1/14
See application file for complete search history.

(56) References Cited

U.S. PATENT DOCUMENTS 3,662,992 A * 5/1972 Vittert ....................... B66D 5/04 188/188
4,533,026 A * 8/1985 Bernard ................. A62B 35/04 188/65.2
4,923,037 A * 5/1990 Stephenson ............ A62B 35/04 188/65.1
6,793,046 B2 * 9/2004 Petzl ........................ A62B 1/14 188/65.1

(Continued)

FOREIGN PATENT DOCUMENTS

CN 114941667 A 8/2022
EP 2 777 773 A2 9/2014

(Continued)

OTHER PUBLICATIONS

Apr. 20, 2023 Search Report issued in French Patent Application No. 2209402.

*Primary Examiner* — Bradley T King
(74) *Attorney, Agent, or Firm* — Oliff PLC

(57) ABSTRACT

A clamping device includes a roller rotating around an axis. A member is fixed to the roller. The member is designed to contact a clamp. The member is mounted movable with respect to the axis to contact the clamp or not. Rotation of the roller generates a centrifugal force designed to move the member towards the clamp. When the speed of rotation of the roller reaches a threshold value, the member contacts the clamp to block the roller. The roller is provided with a stop mounted fixedly to the roller and has a fourth contact area. In the second member position, a third contact area of the member is pressing on the fourth contact area. The third contact area is arranged opposite the second contact area.

9 Claims, 7 Drawing Sheets

(56) References Cited

U.S. PATENT DOCUMENTS

| | | | | |
|---|---|---|---|---|
| 6,814,185 | B1 * | 11/2004 | Ostrobrod | A62B 1/14<br>182/191 |
| 7,137,481 | B2 * | 11/2006 | Petzl | A62B 1/10<br>188/65.1 |
| 9,498,660 | B2 * | 11/2016 | Moine | A62B 1/14 |
| 9,623,269 | B2 * | 4/2017 | Oddou | A62B 1/14 |
| 11,660,475 | B2 * | 5/2023 | Malcolm | A62B 1/14<br>182/193 |
| 2005/0082115 | A1 * | 4/2005 | Petzl | A62B 1/14<br>182/5 |
| 2014/0196985 | A1 | 7/2014 | Moine et al. | |
| 2014/0196989 | A1 | 7/2014 | Moine et al. | |
| 2014/0262611 | A1 | 9/2014 | Oddou et al. | |
| 2016/0310767 | A1 | 10/2016 | Resch et al. | |
| 2022/0234868 | A1 * | 7/2022 | Feng | A62B 35/0093 |
| 2024/0093736 | A1 * | 3/2024 | Tarrajat | A62B 35/0081 |

FOREIGN PATENT DOCUMENTS

| | | | |
|---|---|---|---|
| EP | 3 278 840 | A1 | 2/2018 |
| WO | 2013/063414 | A2 | 9/2014 |
| WO | 2014/128085 | A2 | 12/2015 |

* cited by examiner

CLAMPING DEVICE FOR A WIRE ELEMENT AND METHOD FOR CLAMPING A WIRE ELEMENT

BACKGROUND OF THE INVENTION

The invention relates to a clamping device for a wire element and to a method for clamping a wire element.

PRIOR ART

When performing work at heights, to ensure the safety of the person performing the operation it is necessary to connect the person to a rope that acts as a lifeline. The person is attached to a fall arrester device that runs along the lifeline. The fall arrester device has a rotary roller that is configured to rotate in one direction or the other depending on whether the person is ascending or descending.

In the event of a fall, the vertical speed of the fall arrester along the lifeline reaches a threshold value that corresponds to a threshold speed of rotation of a roller with respect to a plate of the fall arrester. When the threshold speed of rotation is reached, the roller blocks which has the effect of blocking the fall arrester on the lifeline. The person attached to the fall arrester is then arrested in his fall.

To form a fall arrester that is efficient and user-friendly, it is important for the fall arrester to follow the rope access technician's progression closely, i.e. for the fall arrester to move with a small amount of friction in one direction or the other. It is also important for the fall arrester to efficiently detect the running speed of the fall arrester along the lifeline which corresponds to a strong contact between the roller and the lifeline and therefore to a non-negligible friction. A configuration of a fall arrester is marketed by the applicant under the brand name "ASAP Lock".

A configuration of a fall arrester is disclosed in the document US 2014/0196985 and in the document US 2014/0196989.

The document US 2014/0262611 discloses a configuration where a roller rotates until it reaches a threshold speed of rotation. Once the threshold speed of rotation has been reached, the roller blocks. The roller is mounted rotating around a rotation shaft. Two members are fitted movable inside the roller and are each actuated by a spring that is configured to bias the latter towards the axis of rotation. When the speed of rotation of the roller increases, the centrifugal force tends to move the members outwards so as to come into contact with clamps. Once the members are in contact with the clamps, the roller can no longer rotate. Each of the members has a contact surface with the clamp that extends over the whole height of the member and over the whole height of the clamp. The clamp and member are located outside the roller which corresponds to a relatively bulky device.

To obtain an efficient fall arrester, it is necessary to have a good detection of the speed of rotation of the roller so as to efficiently detect that the threshold speed has been reached. This is naturally expressed by the formation of a fall arrester of large size in order to have a good reactivity when speed variations occur.

OBJECT OF THE INVENTION

One object of the invention consists in providing a clamping device for a wire element configured to detect the speed of rotation of a roller of the clamping device and to prevent rotation of the roller when a threshold speed is reached that presents a better durability by better managing the stress when clamping is performed.

According to one feature of the invention, a clamping device is proposed that is configured to detect the speed of rotation of a roller of the clamping device comprising:

- a roller mounted rotating around a first rotation shaft, the first rotation shaft defining a first axis of rotation for the roller, the first rotation shaft being fixed to a body;
- a clamp fixed to the body and having a first contact surface;
- at least one member fixed to the roller so as to rotate around the first axis of rotation in an annular volume arranged between the first axis of rotation and the clamp, the at least one member having a second contact surface, the at least one member being mounted movable with respect to the first axis of rotation between a first member position in which a first distance between the first axis of rotation and a distal part of the second contact area is smaller than a second distance between the first axis of rotation and a proximal part of the first contact area and a second member position in which the first distance is greater than the second distance, rotation of the roller generating a centrifugal force designed to move the second contact surface away from the first axis of rotation to increase the value of the first distance so that the second contact surface is in contact with the first contact surface when the speed of rotation of the roller exceeds a threshold speed of rotation, the clamp blocking one direction of rotation of the roller when the first contact surface is in contact with the second contact surface.

The detection device is remarkable in that the roller is provided with a stop mounted fixedly on the roller so that the stop rotates around the first axis of rotation, the stop having a fourth contact area;

- and in that, in the second member position, a third contact area of the member is pressing on the fourth contact area, the third contact area being arranged opposite the second contact area.

In advantageous manner, the member is mounted rotatable around a second rotation shaft between the first member position and the second member position. The stop is in contact with the ratchet element when the member is in the second member position to reduce the mechanical stress on the second rotation shaft.

In a particular configuration, the ratchet element and the second rotation shaft define a functional clearance to reduce the mechanical stress on the second rotation shaft.

In an advantageous development, the roller is hollow and the clamp is arranged inside the roller. In the second member position, the member is pressing on an inner side wall that delineates the hollow in the roller.

Preferentially, in the second member position, the fourth contact area and the third contact area define a first plane that includes the first axis of rotation.

According to one embodiment, in the second member position, the first contact area and the second contact area define a second plane parallel to the first axis of rotation, the first plane being secant to the second plane, the contact between the third contact area and the fourth contact area being separated from the intersection between the first plane and the second plane by the first axis of rotation.

In an advantageous development, the member has a flyweight portion and a ratchet element arranged one after the other in a direction parallel to the first axis of rotation, the ratchet element comprising the second contact surface. In the second member position, the flyweight portion is devoid of contact with the clamp. A distal part of the flyweight portion is farther from the first axis of rotation than a distal part of the second contact surface in an observation along the first axis of rotation. The fourth contact area is formed at least by the ratchet element or by the flyweight portion.

Preferentially, the fourth contact area is formed by the ratchet element and the flyweight portion.

In another advantageous development, in the second member position, the stop defines a complementary surface to the portion of the member that receives the second rotation shaft.

Another object of the invention is to provide a clamping device comprising a detection device according to any one of the foregoing configurations. Such a clamping device enables the stresses to be better managed when clamping of the roller takes place.

It is a further object of the invention to provide a method for clamping a rope that enables the stresses to be better managed in the clamping phases of the roller.

This result tends to be achieved by means of a method for clamping a wire element comprising the following steps:

- providing a clamping device according to the above configuration and a wire element inserted in the clamping device in contact with the roller;
- making the wire element run inside the clamping device so as to make the roller rotate up to a threshold speed of rotation to block the roller and block the wire element inside the clamping device.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
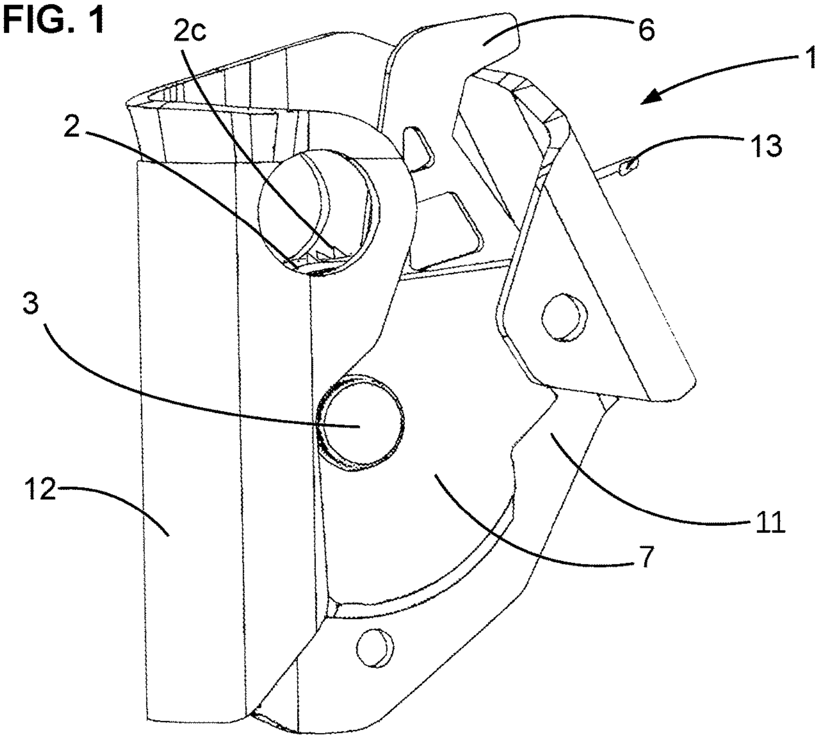
FIG. 1 schematically illustrates a perspective view of a rope clamping device.

FIGS. 1 to 14 illustrate different views of a wire element clamping device 1 preferably a rope clamping device. The clamping device 1 is preferentially a fall arrester. The rope clamping device comprises a roller 2 mounted rotatable in at least a first direction of rotation around a first rotation shaft 3. The first rotation shaft 3 defines a first axis of rotation for the roller 2. The clamping device 1 defines a path designed for a rope to pass. The path defines a through passage one wall of which is formed by the roller 2 so that sliding of the rope in the clamping device makes the roller 2 rotate.

The rope clamping device is configured to block rotation of the roller 2 in at least the first direction of rotation when the speed of rotation of the roller 2 around the first axis of rotation reaches a threshold value. In preferential manner, the roller 2 is configured to rotate freely in both directions of rotation at least when the speed of rotation is lower than the threshold value.

The rope clamping device comprises a detection device configured to detect the speed of rotation of the roller 2 in one direction of rotation. The detection device is configured to allow rotation of the roller 2 when the speed of rotation in the first direction of rotation is lower than the threshold speed and to prevent rotation of the roller 2 when the speed of rotation of the roller 2 in the first direction of rotation reaches the threshold speed. When the detection device detects that the speed of rotation in the first direction of rotation corresponds to the threshold speed, the roller 2 blocks which has the effect of blocking the rope if the latter is present in the rope clamping device.

The detection device comprises the roller 2 and the first rotation shaft 3 that defines the first axis of rotation of the roller 2. The roller 2 is fixed to the first rotation shaft 3. The first rotation shaft 3 passes through the roller 2 or is depressed in the roller 2 so that the roller 2 rotates around the first rotation shaft 3. The first rotation shaft 3 is fixed to a body.

The detection device comprises at least one member 4 that is fixed to the roller 2. When the roller 2 rotates around the first axis of rotation AA, the member 4 rotates around the first axis of rotation. The member 4 is also mounted movable with respect to the first axis of rotation so as to be able to move towards or away from the first axis of rotation AA. In preferential manner, the detection device comprises one, two, three or four members 4. Advantageously, members 4 work independently from one another. In the illustrated embodiment, a single member 4 is used.

The detection device comprises a clamp 5. The clamp 5 is mounted fixedly to a body. The clamp 5 has a first contact surface 5*a* and the at least one member 4 has a second contact surface 4*a* designed to come into contact with the first contact surface 5*a* to block rotation of the roller 2. Each member 4 is mounted movable so that the first contact surface 5*a* moves towards or away from the second contact surface 4*a*. The member 4 moves in a plane perpendicular to the first axis of rotation AA. The same plane perpendicular to the first axis of rotation AA passes through the first contact surface 5*a* and the second contact surface 4*a*.

The centre of gravity of the member 4 is offset from the first axis of rotation AA so that rotation of the roller 2 around the first axis of rotation AA results in rotation of the member 4 around the first axis of rotation AA and generation of a centrifugal force that tends to move the second contact surface 4*a* away from the first axis of rotation. The greater the speed of rotation of the roller 2 around the first axis of rotation AA, the greater the speed of rotation of the at least one member 4 and the farther the second contact surface 4*a* moves away from the first axis of rotation AA so that the second contact surface 4*a* moves towards the first contact surface 5*a*.

The at least one member 4 is mounted movable with respect to the first axis of rotation AA between a first position and a second position.

The clamp 5 is configured to prevent rotation of the roller 2 around the first axis of rotation in the first direction of rotation when the first contact surface 5*a* is in contact with the second contact surface 4*a*. When the speed of rotation of the roller 2 reaches a threshold value, the force generated on the at least one member 4 is such that the second contact surface 4*a* comes into contact with the first contact surface 5*a* which blocks rotation of the at least one member 4 and thereby blocks rotation of the roller 2 at least in the first direction of rotation. When the member 4 is in contact with the clamp 5, the clamp 5 blocks rotation of the roller 2 in the first direction of rotation. When the member 4 is in the second member position, it is preferable for the member 4 to be in contact with the inner side wall of the roller 2. In an advantageous embodiment, a flyweight portion 4*b* and a ratchet element 4*c* are mounted fixedly to one another and advantageously form part of a monolithic member.

Figure 4:
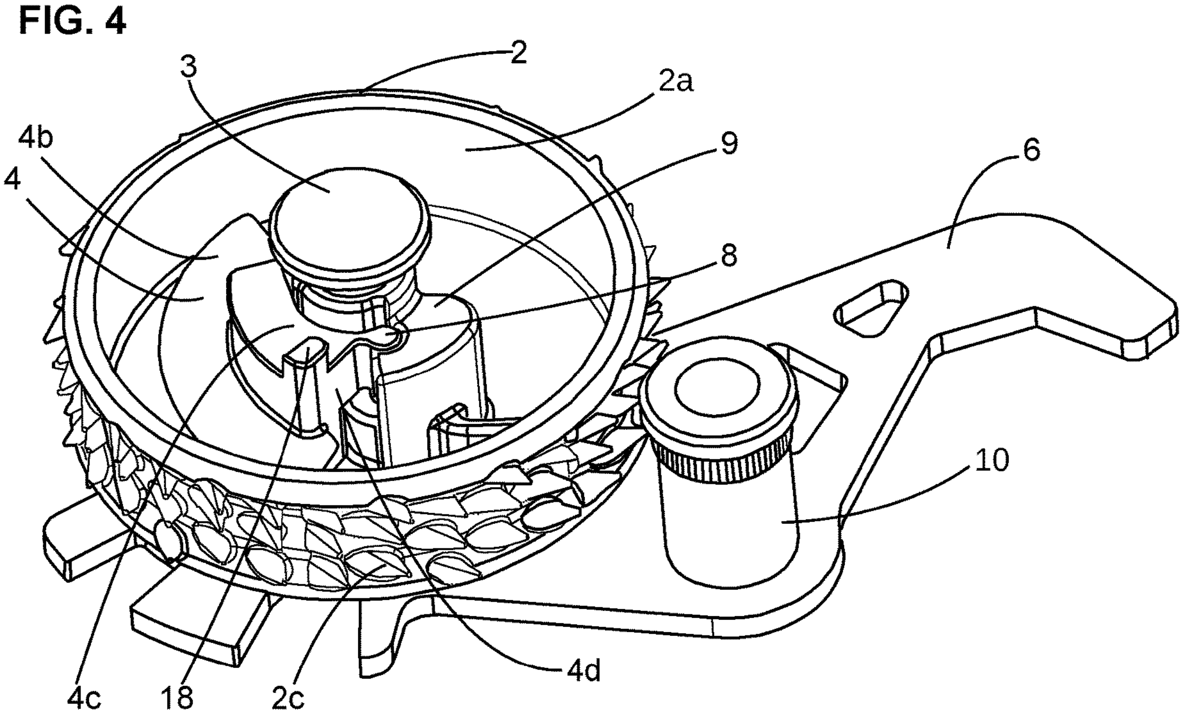
FIG. 4 schematically illustrates a perspective view of a detection device of the speed of a rope clamping device with a member in a position enabling rotation of the roller.
Figure 5:
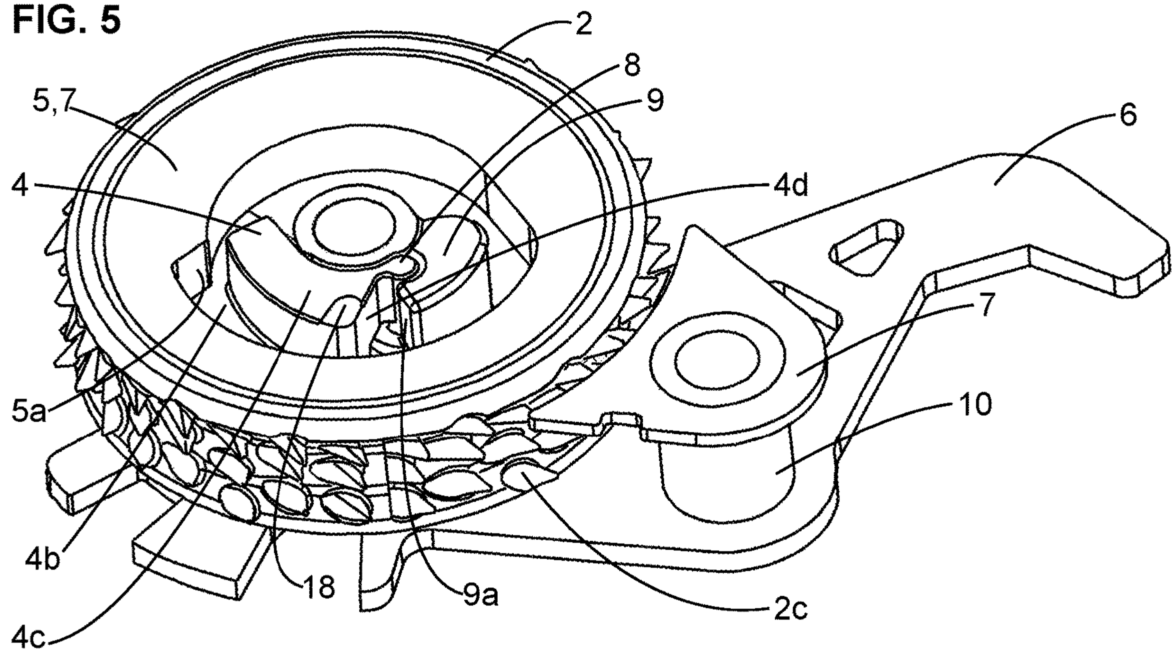
FIG. 5 schematically illustrates a perspective view of a detection device of the speed of a rope clamping device with a member in a position enabling rotation of the roller and with the clamp installed.
Figure 6:
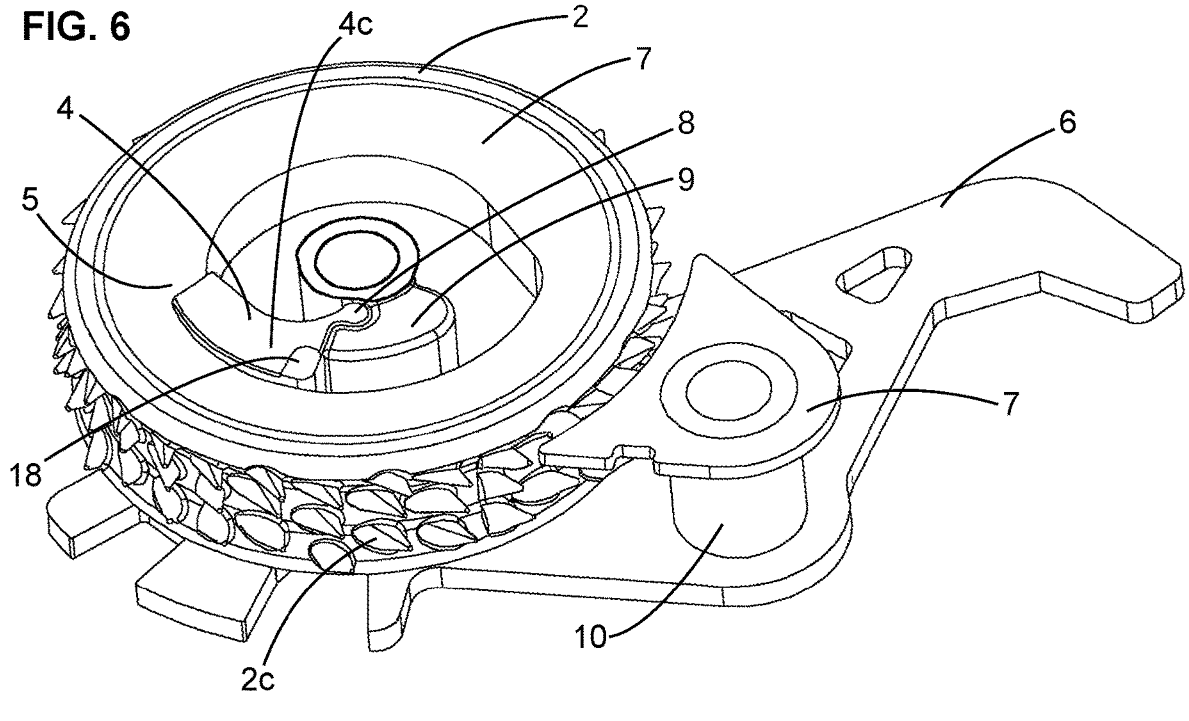
FIG. 6 schematically illustrates a perspective view of a detection device of the speed of a rope clamping device with a member in a position blocking rotation of the roller and with the clamp installed.

In the first member position illustrated in FIGS. 4 and 5, the second contact surface 4*a* of the at least one member 4 is not in contact with the first clamping surface 5*a* of the clamp 5. In other words, a first distance between the first axis of rotation AA and a distal part of the second contact surface 4*a* is smaller than a second distance between the first axis of rotation AA and a proximal part of the first contact surface 5*a*. In the second member position illustrated in FIGS. 6 to 8, the second contact surface 4*a* of the at least one member 4 is in contact with the first clamping surface 5*a* of the clamp 5. In other words, the first distance is larger than the second distance.

The detection device defines an annular volume that is arranged between the first axis of rotation AA and the clamp 5. So long as member 4 is inside the annular volume, the member 4 is able to rotate. When the member 4 extends beyond the annular volume, rotation of the member 4 will result in first contact surface 4*a* coming into contact with the second contact surface 4*a*, which will lead to clamping of the roller 2.

In the first member position illustrated in FIGS. 4 and 5, the speed of rotation of the roller 2 is such that the clamp 5 does not oppose rotation of the roller 2 in the first direction of rotation. In the second member position illustrated in FIGS. 6 to 8, the speed of rotation of the roller 2 has reached the threshold speed and the member 4 comes and presses against the clamp 5 to prevent rotation of the roller 2 in the first direction of rotation.

To obtain efficient clamping of the roller 2, it is important for the area of the contact surface between the member 4 and the clamp 5 to be greater than a value below which risks of slipping may arise preventing correct clamping. It is also important, below the threshold speed of rotation, for the roller 2 and the member 4 to be able to rotate around the first axis of rotation AA without the member 4 coming into contact with the clamp 5. It is therefore important that a sizeable spacing exist between the member 4 and the clamp 5 when the member 4 and the clamp 5 are arranged radially facing one another and the roller 2 is at a standstill or at low speed.

It is particularly advantageous for the second contact surface 4*a* of the member 4 to be biased by a spring in the direction of the first axis of rotation. The value of the spacing and the stiffness of the spring define the value of the centrifugal force that causes movement of the member 4 such that the member 4 comes and presses on the clamp 5 thereby defining the threshold speed value.

In advantageous manner, the detection device has a spring that is configured to bias the at least one member 4 so that the second contact surface 4*a* moves away from the first contact surface 5*a*. When the speed of rotation of the roller 2 reaches the threshold value, the centrifugal force applied on the member 4 is sufficiently high to oppose the force generated by the spring thereby enabling the first contact surface 5*a* to be brought into contact with the second contact surface 4*a* and clamping of the roller 2. The spring opposes the centrifugal force applied on the member 4, i.e. applies a force directed towards axis of rotation AA. The spring is connected on the one hand to the member 4 and on the other hand to the roller 2.

It is also possible to connect the spring to the member 4 and to the first rotation shaft 3. In the embodiment illustrated in the different figures, the spring is installed in a cavity formed in the member 4, the spring being installed between the member 4 and the bottom of the roller 2.

In order to reduce the footprint of the detection device, the distance separating the member 4 and the first axis of rotation is reduced which has the effect of reducing the centrifugal force applied on the member 4. This has the consequence of less well defining the threshold speed of rotation causing clamping of the roller 2. When the member 4 is moved towards the first axis of rotation AA, this also has the effect of reducing the volume of the member 4 and therefore its mass. There again, this modification results in a decrease of the centrifugal force and therefore a decrease of the sensitivity of the detection device with respect to the speed of rotation of the roller 2. When the sensitivity of the detection system decreases, clamping of the roller 2 is performed over a speed range that presents a wider distribution around the threshold speed.

To increase the sensitivity of detection of the detection device, it is necessary to increase the mass of the member 4 and/or the distance between the first axis of rotation and the centre of gravity of the member 4. These two criteria do not fall in line with a reduction of the size of the detection device.

To increase the sensitivity of detection of the speed of rotation of the roller 2, it is advantageous to increase the distance between the centre of gravity of the member 4 and the first axis of rotation AA. To obtain such a result without increasing the footprint of the member and therefore without increasing the size of the detection system, it is particularly advantageous to form a stepped member 4, i.e. a member that has a flyweight portion **4*b* and a ratchet element 4*c*** located on two different levels with respect to the first axis of rotation AA of the roller.

The ratchet element **4*c* has the second contact surface 4*a* and the flyweight portion 4*b* does not have the second contact surface 4*a*. The flyweight portion 4*b* is not designed to come into contact with the clamp 5 to block rotation of the roller 2. The flyweight portion 4*b* and the ratchet element 4*c* do not have the same shape in an observation in a direction parallel to the first axis of rotation AA. The flyweight portion 4*b* and the ratchet element 4*c*** are arranged following one another in a direction parallel to the first axis of rotation AA or substantially parallel to the first axis of rotation AA.

The distal part of the flyweight portion **4*b* is farther from the first axis of rotation AA than the distal part of the second contact surface 4*a* and in more general manner than the distal part of the ratchet element 4*c* in a radial direction that extends from the first axis of rotation AA. The centre of gravity of the flyweight portion 4*b* is farther from the first axis of rotation than the centre of gravity of the ratchet element 4*c*. This makes it possible to have an increase of the centrifugal force in comparison with a member of constant or substantially constant cross-section over the whole height of the member 4** (in direction AA).

In preferential manner, the flyweight portion **4*b* has a part that is facing the ratchet element 4*c* in an observation along the first axis of rotation AA, and it is advantageous for the facing part to correspond to at least 50% of the surface of the ratchet element 4*c*, preferably at least 75%. Preferentially, the ratchet element 4*c* is integrally facing the flyweight portion 4*b*** in an observation along the first axis of rotation AA.

In preferential manner, in an observation along the first axis of rotation AA, the flyweight portion **4*b* has a surface that is at least 30% larger than the surface of the ratchet element 4*c*. It is advantageous for the ratchet element 4*c* and the flyweight portion 4*b* to be in the form of two arcs of rings. It is preferable for the flyweight portion 4*b* to extend beyond one of the two ends of the ratchet element 4*c* in an arc of a circle the centre of which corresponds to the first axis of rotation AA. This enables the mass of the member to be increased without increasing the dimensions of the ratchet element 4*c*. This configuration enables the centre of gravity to be located farther away in comparison with a member 4 only comprising the ratchet element 4*c*. As the flyweight portion 4*b* belongs to a plane distant from first clamping surface 5*a*, it circumvents the obligations as regards the spacing between first clamping surface 5*a* and second clamping surface 4*a* when the roller 2 has to rotate or as regards the minimum contact area between the ratchet element 4*c* and the clamp 5 when the roller 2** has to be clamped.

In comparison with the configuration disclosed in the document US 2014/0262611 where the member is of identical shape over the whole height of the member, the flyweight portion **4*b*** enables the centre of gravity to be located farther away thereby enabling the centrifugal force to be increased for a given threshold speed of rotation.

The stepped configuration of the member 4 with a flyweight portion **4*b* that is offset with respect to the ratchet element 4*c*** enables the centrifugal force generated/size trade-off to be improved.

When the member 4 is in the second position, i.e. the position designed to block the roller 2, the flyweight portion **4*b* is located at a distance from the first axis of rotation AA that is greater than the distance that separates the first axis of rotation AA and the contact area between the member 4 and the clamp 5**.

In preferential manner, when the member 4 is in the second position with the ratchet element **4*c* pressing on the clamp 5, it is advantageous for the flyweight portion 4*b* to extend beyond the ratchet element 4*c* over a distance that is equal to at least 10% of the radius between the first axis of rotation AA and the distal part of the contact area between the clamp 5 and the ratchet element 4*c*. Even more preferentially, the flyweight portion 4*b* extends beyond the ratchet element 4*c*** over a distance that is equal to at least 20%.

To improve the compactness, it is particularly advantageous to use a roller 2 that is hollow and to locate the member 4 inside the roller 2. It is possible to form a detection device that detects the threshold speed better without modifying the diameter of the roller 2. The clamp 5 is at least partially located inside the roller 2 which enables a particularly compact detection device to be formed without impairing the sensitivity of detection of the speed of rotation of the roller 2. It is to advantageous for the flyweight portion **4*b* and/or the ratchet element 4*c* to be located inside the hollow of the roller 2**.

When the clamp 5 is installed in the inner volume of the roller 2 that is hollow, the clamp 5 does not form an obstacle over the whole height of the inner volume of the roller 2. The height is the dimension parallel to the first axis of rotation AA. The clamp 5 leaves a space in the roller 2 so as to enable the flyweight portion **4*b* to rotate above or below the clamp 5. In other words, in the first member position, a radial distance between the first axis of rotation AA and the distal part of the flyweight portion 4*b* is greater than a radial distance between the first axis of rotation AA and a proximal part of first clamping area 5*a*. The flyweight portion 4*b* can then rotate around the first axis of rotation AA and pass over or under the clamp 5 in a direction of observation parallel to the first axis of rotation AA when the roller 2 rotates so long as the threshold speed is not reached. Once the threshold speed has been reached, the ratchet element 4*c* comes and presses on the clamp 5 which prevents rotation of the flyweight portion 4*b* and rotation of the roller 2** in first direction of rotation AA.

Figure 7:
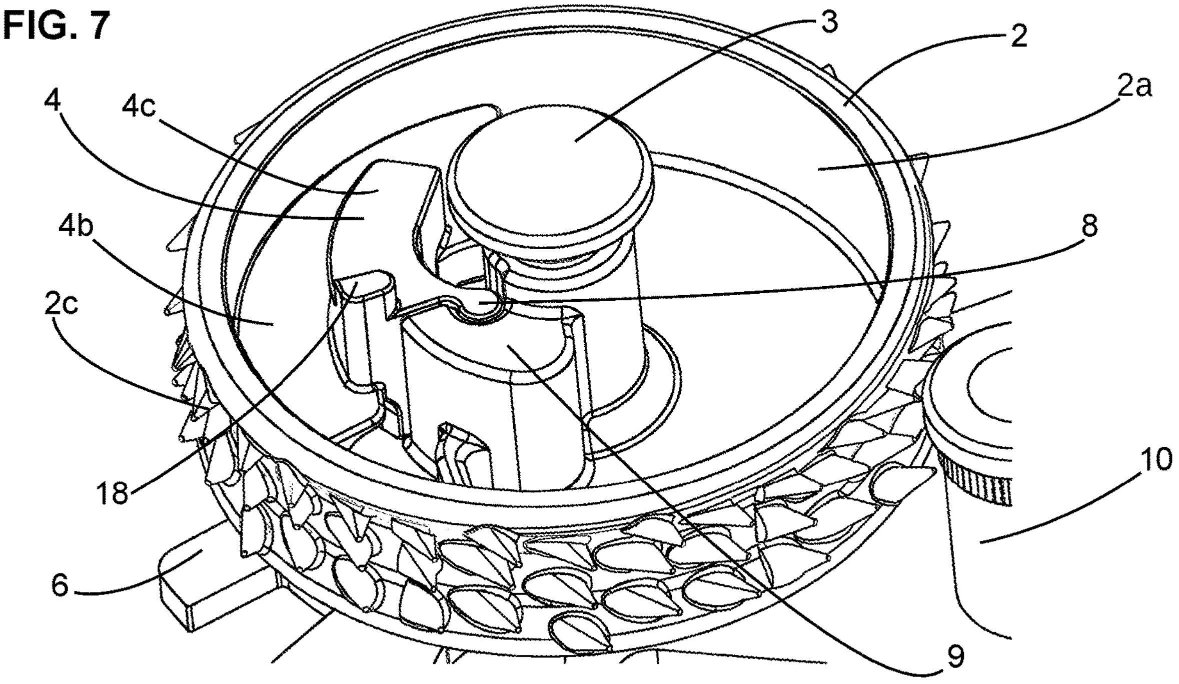
FIG. 7 schematically illustrates a perspective view of a detection device of the speed of a rope clamping device with a member in a position blocking rotation of the roller and without the clamp installed.
Figure 8:
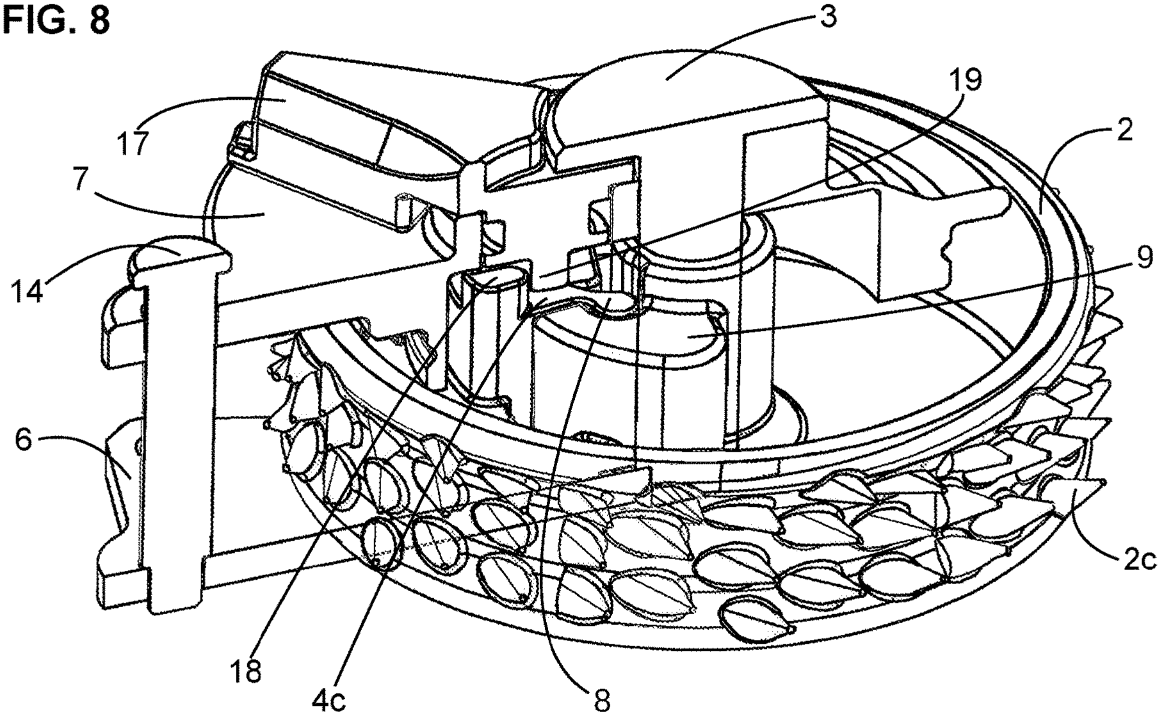
FIG. 8 schematically illustrates a perspective view of a cross-section of a detection device of the speed of a rope clamping device in a member position blocking rotation of the roller with the clamp installed and a roller clamping button in a position enabling rotation of the roller with a sectional view of the plates, the first rotation shaft and a clamping button.
Figure 9:
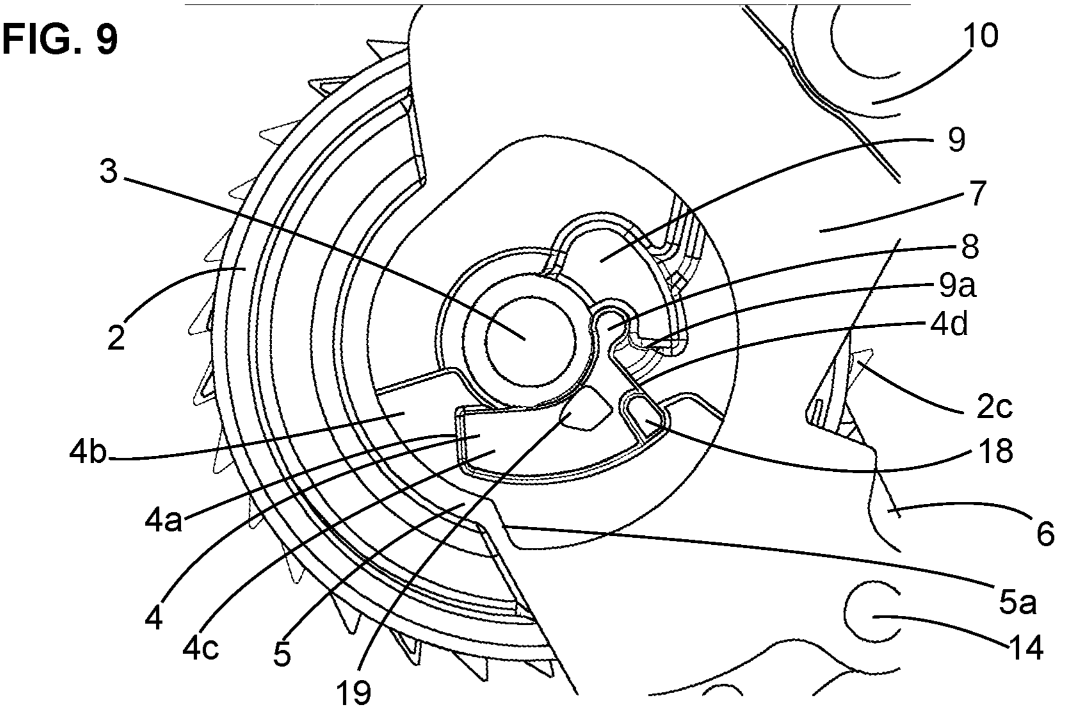
FIG. 9 schematically illustrates a top view of a detection device of the speed of a rope clamping device with a slide in a position allowing rotation of the roller.
Figure 10:
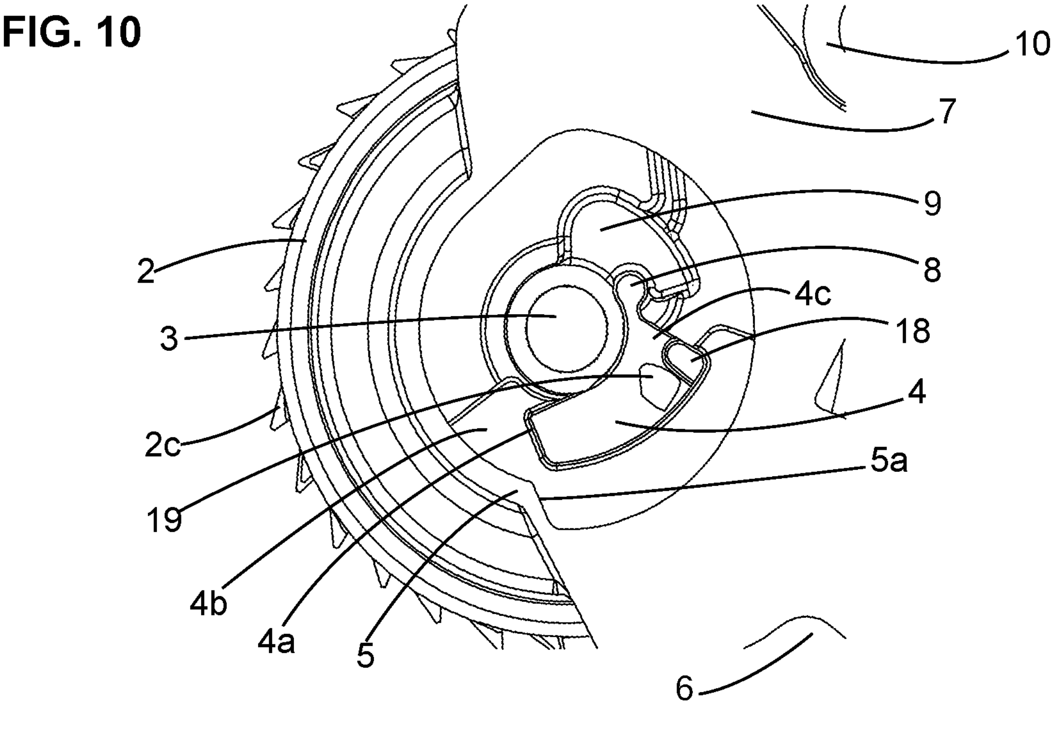
FIG. 10 schematically illustrates a top view of a detection device of the speed of a rope clamping device with a slide in a position that is designed to block rotation of the roller.
Figure 11:
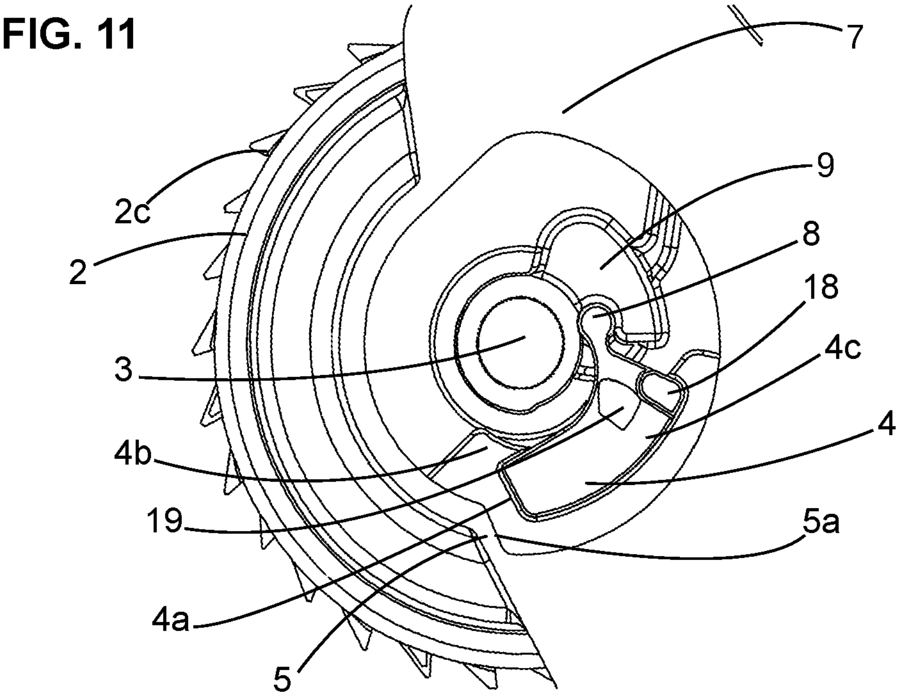
FIG. 11 schematically illustrates a top view of a detection device of the speed of a rope clamping device with a slide in a position that is designed to block rotation of the roller and the pin that slides along the slide.

In a particular embodiment illustrated in FIG. 7, when the first clamping area **5*a* is in contact with the second contact surface 4*a*, the flyweight portion 4*b* comes into contact with inner side wall 2*a* of the roller 2. When the flyweight portion 4*b* comes into contact with inner side wall 2*a* of the roller 2 it is advantageous for the ratchet element 4*c* to be included in a circle the radius of which is equal to ⅔ of the radius defined by inner side wall 2*a* of the roller 2** and the first axis of rotation.

In particularly advantageous manner, the flyweight portion **4*b* and the ratchet element 4*c*** are mounted fixedly to one another.

In a particular embodiment, when the first clamping area **5*a* is not in contact with the second contact surface 4*a*, the distance between the first axis of rotation AA and the distal part of the flyweight portion 4*b* is greater than or equal to the distance between the first axis of rotation AA and the proximal part of the first clamping area 5***a*. This configuration enables the centrifugal force effect to be increased without impairing the compactness of the detection device.

In preferential manner, in the first member position, the proximal part of the ratchet element 4*c* is located against the side wall of the roller 2 defining a hole for the first rotation shaft 3 to pass through. It is then advantageous for the distance between the distal part of the ratchet element 4*c* and the first axis of rotation AA to be smaller than or equal to ⅔ of the radius between the first axis of rotation AA and the distal part of the flyweight portion 4*b*. This configuration enables the ratio between the sensitivity of speed detection and the compactness of the detection device to be improved.

The distal part of the ratchet element 4*c* is the part of the ratchet element 4*c* the farthest from the first axis of rotation. The distal part of the flyweight portion 4*b* is the part of the flyweight portion 4*b* the farthest from the first axis of rotation. The proximal parts on the other hand are the parts the nearest to the first axis of rotation AA. Preferably, the comparison of the distances between the distal parts of the ratchet element 4*c* and of the flyweight portion 4*b* is made for the same radius. The same is the case for the comparison between the proximal parts or between the proximal and distal parts.

In particularly advantageous manner, in an observation along the first axis of rotation AA, the flyweight portion 4*b* extends radially beyond the distal part of the ratchet element 4*c* and it also extends in circumferential manner as illustrated in the different figures. Preferentially, the flyweight portion 4*b* extends from both of the circumferential ends of the ratchet element 4*c*.

In an observation along the first axis of rotation, it can be observed that the ratchet element 4*c* is located between the salient part of the flyweight portion 4*b* and the first axis of rotation AA.

In preferential manner, the flyweight portion 4*b* represents at least 20% of the mass of the member 4. Even more preferentially, the flyweight portion represents at least 33% of the mass of the member 4. The flyweight portion 4*b* and the ratchet element 4*c* are separated by a plane perpendicular to the first axis of rotation AA that passes through the end of first contact area 5*a* and of the second contact area 4*a*. The mass of the flyweight portion corresponds to the mass of the member situated on the same side as the plane containing the flyweight portion whereas the mass of the ratchet element 4*c* corresponds to the mass of the rest of the member 4 situated on the other side of the plane.

In preferential manner illustrated in FIGS. 9 to 13, in the second member position, i.e. in the position designed to block the roller 2, it is advantageous for the radius between the first axis of rotation AA and the distal part of first contact area 5*a* to be less than or equal to 75% of the radius between the first axis of rotation and the distal part of the flyweight portion 4*b*. Advantageously, the radius between the first axis of rotation and first contact area 5*a* is less than or equal to 75% of the radius of inner side wall 2*a* of the roller 2 when the roller 2 is hollow and receives the clamp 5 and also the member 4.

The use of a hollow the roller 2 is particularly advantageous as it enables the compactness of the structure to be improved. Preferably, a plane perpendicular to the first axis of rotation AA passes through the ratchet element 4*c*, the clamp 5 and groove 2*b* of the roller 2 that is to receive the rope.

Improving the compactness of the detection device without impairing the sensitivity of detection of the speed of rotation of the roller 2 enables the diameter of the roller 2 to be reduced. By reducing the diameter of the roller 2, for a given linear rope speed in the clamping device, the speed of rotation of the roller 2 is increased thereby increasing the effect on the centrifugal force. In other words, breaking the member 4 down into a flyweight portion 4*b* and a ratchet element 4*c* that are arranged one after the other in a direction parallel to the first axis of rotation enables the diameter of the roller 2 to be reduced without reducing the sensitivity of detection as it becomes possible to increase the speed of rotation of the roller 2 for a given linear rope speed.

This configuration is particularly advantageous since, as illustrated in FIGS. 1 to 14, detection device 1 of the speed of rotation of the roller 2 is completely or almost completely installed inside the roller 2.

In the embodiments illustrated in FIGS. 1 to 3 and 8 to 14, the roller 2 is arranged between a first plate 6 and a second plate 7 of the body. The first rotation shaft 3 is fixed to the first plate 6 and to the second plate 7. The roller 2 rotates around the first rotation shaft 3 in the body and more precisely between plates 6 and 7 that are fixed. The roller 2 is a blind part except for the hole for the first rotation shaft 3 to pass. The member 4 is fixed to the roller 2 to follow the rotation of the roller 2 around the first axis of rotation AA. It is advantageous for the member 4 to be mounted rotatable between the first position and the second position, preferably around a second rotation shaft 8. Preferably, the second rotation shaft 8 is fixed to the roller 2 so that the second rotation shaft 8 rotates around the first rotation shaft 3. The member 4 is fixed to the second rotation shaft 8 so that the member 4 rotates around the first rotation shaft 3 and rotates around the second rotation shaft 8.

In advantageous manner, in the second member position, the member 4 presses on a stop 9 of the roller 2 that is offset from the second rotation shaft 8. The member 4 has a third contact area 4*d* that presses on a fourth contact area 9*a* formed by the stop 9 when the member is in the second member position enabling the mechanical stress on the second rotation shaft 8 to be reduced. In the second member position, the stop 9 of the roller 2 exerts a force on the member 4 and the member 4 exerts a force on the clamp 5 to block rotation of the roller 2 in the first direction of rotation without stressing the second rotation shaft 8 too greatly. Clamping of the stop 9 results in clamping of the roller 2. The stop 9 of the roller 2 is mounted fixedly with respect to the roller 2. To perform clamping of the roller 2, the ratchet element 4*c* is on the one hand pressing on the stop 9 and on the other hand pressing against the clamp 5. In the clamping position blocking rotation of the roller 2, the ratchet element 4*c* is located between the stop 9 and the clamp 5. This configuration enables the forces applied on the second rotation shaft 8 to be reduced. Preferentially, when the third contact area 4*d* and the fourth contact area are flat surfaces, they form a first plane that includes the first axis of rotation, as illustrated in FIGS. 9 to 14. The pressing direction is tangential which limits the stress on the second rotation shaft. It is also possible to have textured, for example crenelated or sawtooth, contact areas to reduce or prevent the appearance of a force extending radially and stressing the second rotation shaft 8.

When a stop 9 is used, it is advantageous for the member 4, more preferentially the ratchet element 4*c*, and the second rotation shaft 8 to define a functional clearance 20 in a direction perpendicular to axis AA representing the axis of rotation of the roller 2. Preferably, the functional clearance 20 extends at least in an arc of a circle the radius of which extends from axis of rotation AA of the roller 2 and passes through the second rotation shaft 8. Advantageously, the arc of a circle has axis of rotation AA as its centre. Introducing a functional clearance 20 is particularly advantageous so as not to mechanically stress the second rotation shaft 8 when the member 4 is pressing on the one hand against the clamp 5 and on the other hand against the stop 9.

Figure 12:
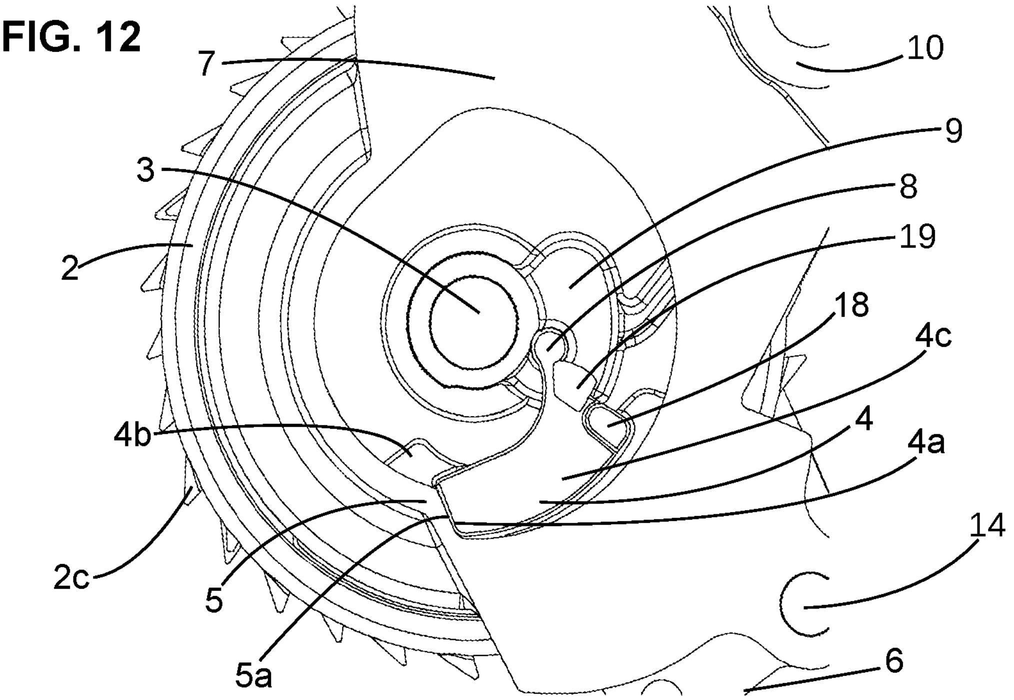
FIG. 12 schematically illustrates a top view of a detection device of the speed of a rope clamping device with a slide in a position that is designed to block rotation of the roller and the slide that pushes the member to the clamping position.
Figure 13:
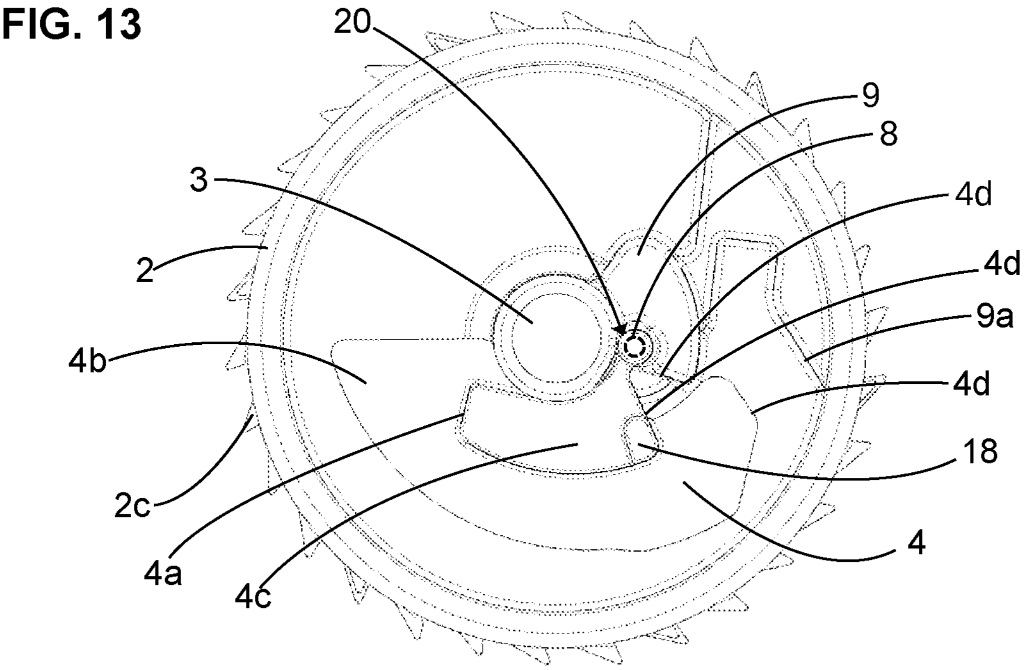
FIG. 13 schematically illustrates a top view of another embodiment of a detection device of the speed of the rope clamping device with the member in the first member position.
Figure 14:
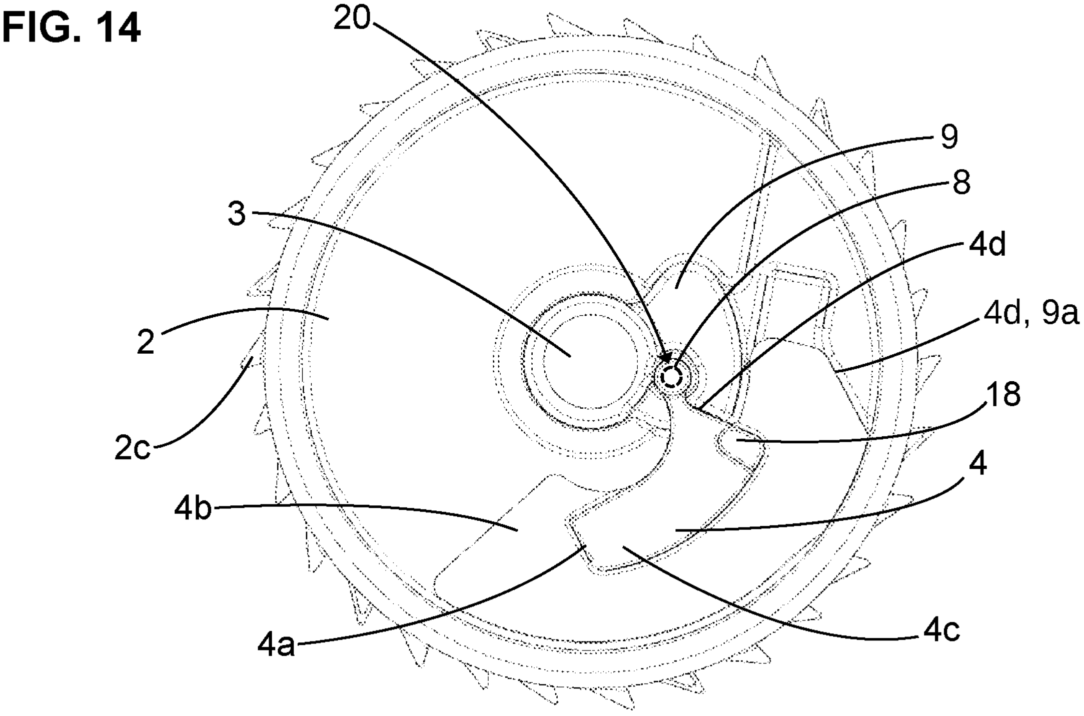
FIG. 14 schematically illustrates a top view of another embodiment of a detection device of the speed of the rope clamping device with the member in the second member position.

In order not to stress the second rotation shaft 8 too heavily, it is preferable for the member 4 to press against the peripheral side wall of the roller 2 in the second member position, as illustrated in FIGS. 12 and 14.

It is also advantageous, in the second member position, for first contact area 5*a* and second contact area 4*a* to define a second plane parallel to the first axis of rotation AA. The first plane is secant to the second plane, the contact between the third contact area 4*d* and fourth contact area 9*a* being separated from the intersection between the first plane and the second plane by the first axis of rotation AA in an observation along the first axis of rotation AA.

The use of a stop 9 is particularly advantageous in association with a stepped member 4, but it is also possible to have a stop 9 that blocks rotation of a roller 2 with a member according to one of the prior art configurations, in particular a configuration where the cross-section of the member 4 is constant or substantially constant over the whole height of the member.

In the embodiment illustrated in FIGS. 1 to 12, the third contact area 4*d* is mainly or solely formed by the ratchet element 4*c*. The third contact area 4*d* does not extend beyond the radius defined by the distal part between the ratchet element 4*c* and the axis of rotation of the roller 2. In the embodiment illustrated in FIGS. 13 and 14, the third contact area 4*d* is formed in the ratchet element 4*c* and also in flyweight part 4*b*. It is advantageous for the third contact area 4*d* to be formed by a surface of the flyweight portion 4*b* and preferentially at a greater distance than the contact area between the stop and the ratchet element 4*c*.

It is advantageous for second rotation shaft 8 to be located at a radius from the first axis of rotation AA that is smaller than the radius of the second contact surface 4*a* when the member 4 is in the second member position.

Figure 2:
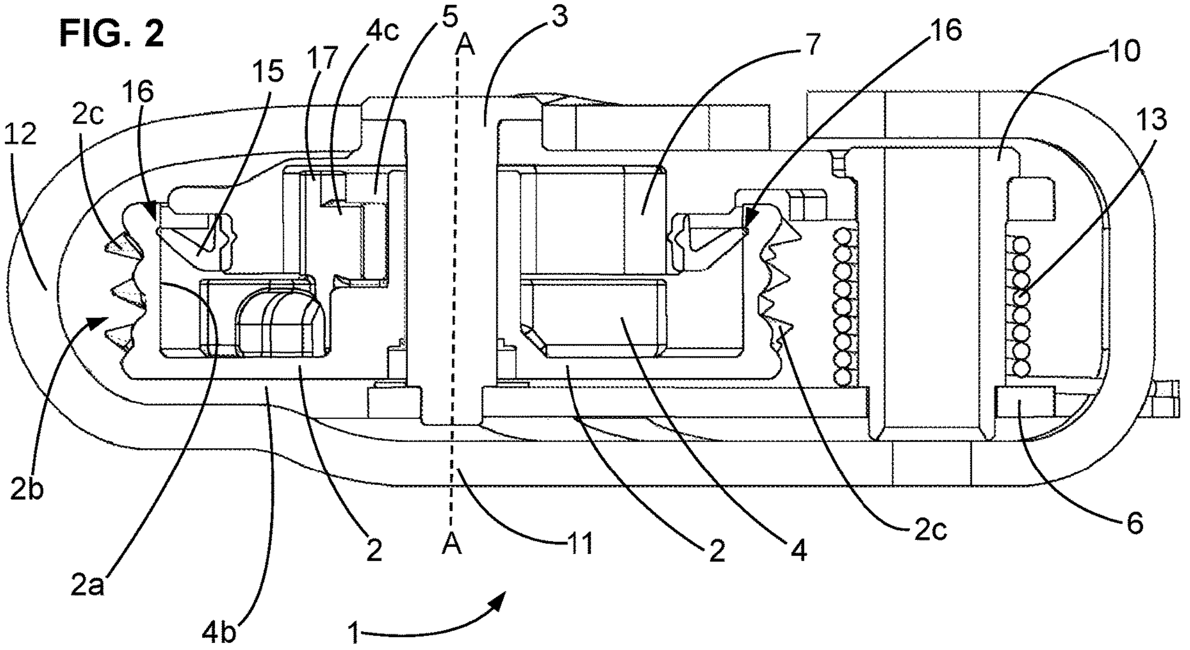
FIG. 2 schematically illustrates a cross-sectional view of a rope clamping device.
Figure 3:
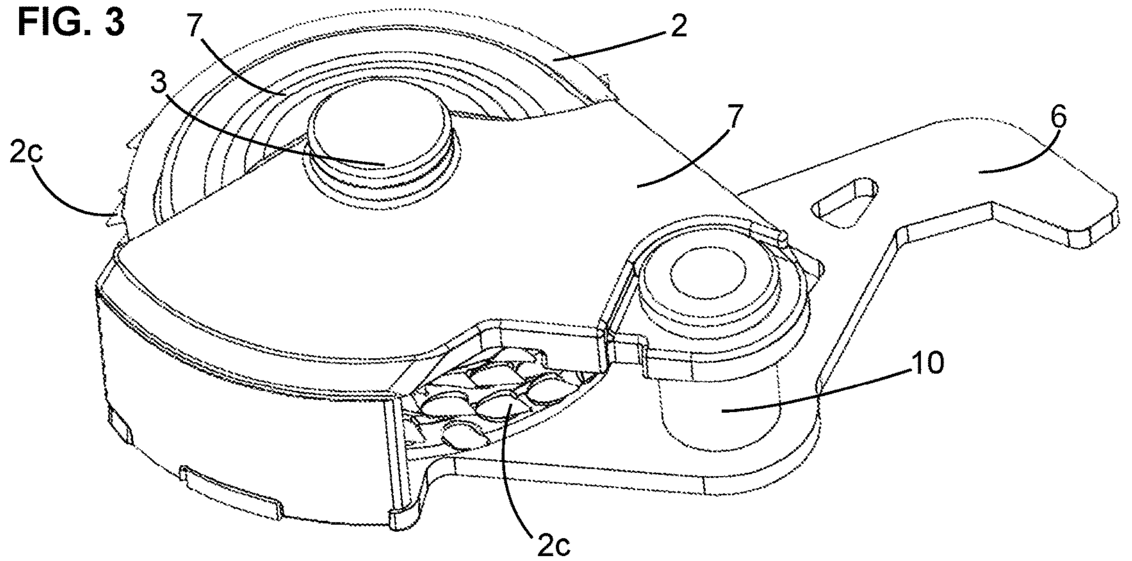
FIG. 3 schematically illustrates a perspective view of a detection device of the speed of a rope clamping device.

In preferential manner, the first plate 6 and the second plate 7 of the body are fixed to one another by means of a third rotation shaft 10 that is also fixed on a support 11. As illustrated in FIG. 2, the third rotation shaft 10 and the first rotation shaft 3 are fixed to one another so as to form a monoblock assembly with the first plate 6 and the second plate 7. The monoblock assembly is mounted movable with respect to the support 11 and mounted rotatable around the third rotation shaft 10. The first rotation shaft 3 is mounted swivelling around the third rotation shaft 10.

The monoblock assembly swivels with respect to the support 11 so as to define an open position allowing a rope to be inserted in or removed from the support 11 of the rope clamping device, here of the fall arrester. Preferentially, the support 11 has a U-shaped area 12 that defines a ring designed to receive a rope. The ring to opens or closes by means of the monoblock assembly that is movable and in particular by means of the roller 2 that moves with respect to the support 11.

In preferential manner, the monoblock assembly is biased by means of a second spring 13 so that the monoblock assembly is by default, i.e. in the absence of an external force, in the position that keeps the rope inside the fall arrester and more precisely inside the U-shaped area 12. The spring biases the roller towards the U-shaped area for the purpose of pressing the rope against the U-shaped area so as to have a strong contact between the rope and the roller 2 when the clamping device moves with respect to the rope.

In preferential manner, the roller 2 has a groove 2*b* that is textured i.e. a non-smooth groove. Groove 2*b* can be provided with spikes 2*c* or groovings so as to increase the friction between the roller 2 and the rope.

Advantageously, the second plate 7 defines the clamp 5 and depresses into the hollow of the roller 2. The second plate 7 enables rotation of the roller 2 to be blocked. Fixing of the second plate 7 with the first plate 6 by means of the first rotation shaft 3 and the third rotation shaft 10 enables a particularly efficient the clamp 5 to be formed. In the advantageous embodiment illustrated in FIGS. 8 and 14, the first plate 6 is fixed to the second plate 7 by means a rod 14.

It is particularly advantageous to provide for the second plate 7 to close off the cavity defined in the roller 2. It is preferable for the speed detection device to be provided with a seal 15 of annular cross-section that connects the roller 2 and the second plate 7. It is advantageous for inner side wall 2*a* of the roller 2 to have a grooving 16 that extends circularly. The seal 15 is inserted in the grooving 16 so as to provide a tight sealing. The seal 15 that connects the second plate 7 with the roller 2 in association with a roller 2 that is blind forms a substantially tightly sealed space enabling the lifetime of the detection device to be improved.

In a particular embodiment, a button 17 is fixed to the body and preferentially to the second plate 7 and is mounted movable with respect to the second plate 7. The button 17 is movable between a first button position and a second button position. The button 17 is mounted movable with respect to the first axis of rotation AA. In the first button position, the button 17 does not interact with the member 4 that operates as described above. In the second button position, the button 17 causes clamping of the roller 2 when the roller 2 rotates in the first direction of rotation.

The member 4 is provided with a pin 18. It is advantageous for the pin 18 not to be facing second clamping area 4*a* in a plane perpendicular to the first axis of rotation AA. The pin 18 can be mounted salient from the ratchet element 4*c* or from the flyweight portion 4*b* in a direction parallel to the first axis of rotation AA. The pin 18 is preferentially mounted fixedly on the member 4. The pin 18 rotates around first axis of rotation 3 when the roller 2 rotates around first axis of rotation 3. The pin 18 moves between a first pin position and a second pin position. The pin 18 rotates around the first axis of rotation AA at a distance from the first axis of rotation AA that is greater than or equal to a first value. The first value corresponds to the minimum distance between the first axis of rotation AA and the pin 18 when the member 4 is in the first member position, for example the roller 2 is immovable. When the member 4 is in the second member position, the pin 18 is separated from the first axis of rotation by a second value higher than the first value. The annular volume has a maximum radius that corresponds to the second value.

The button 17 defines a slide 19. In the first button position, the slide 19 is arranged in such a way as not to come into contact with the pin 18, and does not form an obstacle to rotation of the pin 18. The pin 18 rotates in a plane that is perpendicular to the first axis of rotation AA. In the first button position, the slide 19 is located outside the plane of rotation of the pin 18 and/or at a distance from axis of rotation AA that is smaller than the first value or that is greater than the second value, for example greater than the radius of the roller 2. The slide 19 is arranged outside positions that the pin 18 is able to take when the roller rotates.

In the second button position, the slide 19 is arranged to form an obstacle to movement of the pin 18. The slide 19 is in the plane of rotation of the pin 18, i.e. in a plane perpendicular to the first axis of rotation AA and passing through the pin 18. The slide 19 forms an obstacle that extends from the first value to a third value that is higher than the first value. When the roller 2 makes a turn, the pin 18 slides along the slide moving the member 4 to the second member position. The third value can be the second value which corresponds to the member 4 in the second member position. As an alternative, the third value corresponds to the member 4 in a position such that the distance between the first axis of rotation AA and the distal part of second contact area 4*a* is greater than the distance between the first axis of rotation AA and the proximal part of first contact area 5*a*. In this configuration, the ratchet element 4*c* is far enough away from the first axis of rotation AA for the ratchet element 4*c* to come into contact with the clamp 5 resulting in clamping of the roller 2.

In advantageous manner, when the member 4 is in the second member position and the button is in the second button position, the slide 19 has no contact with the pin 18 so as to prevent the slide 19 and the pin 18 from taking up the clamping forces of the roller 2.

When the roller 2 rotates in first direction of rotation and the button 17 is in the second button position, the pin 18 comes into contact with the slide 19. Rotation of the roller in the first direction of rotation makes the pin 18 slide along the slide 19 and sliding of the pin 18 along the slide 19 results in movement of the ratchet element 4*c* that moves away from the first axis of rotation AA, i.e. that moves towards the position corresponding to the second member position.

When the pin 18 is in the first pin position, the member 4 is in the first member position. When the pin 18 is in the second pin position, the member 4 is in the second member position. The pin 18 is mounted fixedly with respect to second contact area 4*a*.

In advantageous manner, when the button 17 moves between the first button position and second button position, the slide 19 moves only in a plane perpendicular to the first axis of rotation AA. Preferentially, the button 17 is mounted movable so as to move towards or away from the first rotation shaft 3 between the first button position and the second button position.

Movement of the member 4 from the first position to the second position is independent from the speed of rotation of the roller 2. Clamping of the roller 2 is obtained at the latest when the roller 2 has made a complete turn.

Such a button 17 is particularly advantageous as it is simple to manufacture while at the same time being very efficient. Although the button 17 and the pin 18 are presented in association with a stepped member 4, it is possible to use another member configuration. In preferential manner, the pin 18 is not facing second contact area 4*a* in a plane that is perpendicular to the first axis of rotation AA.

In the advantageous embodiments illustrated, when the member 4 is installed inside the cavity defined by the roller 2, the button 17 passes through the second plate 7 so that the button 17 defines a slide 19 for the pin 18 that is separated from the actuating area of the button 17 by the second plate 7. The pin 18 slides along the slide 19.

In the first button position, which corresponds to a first slide position when the speed of rotation of the roller 2 is low, the pin 18 rotates around the first axis of rotation AA and the pin 18 does not come into contact with the slide 19. As the speed of rotation of the roller 2 progressively increases until it reaches the threshold speed, the pin 18 moves from the first position of the pin 18 to the second position of the pin 18 without the pin 18 coming into contact with the slide 19. When the speed of rotation of the roller 2 reaches the threshold speed, the member 4 comes into contact with the clamp 5 which blocks the roller 2 without the pin 18 coming into contact with the slide 19.

In the second button position of the, which corresponds to a second slide position, the slide 19 cuts the trajectory of the pin 18 when the roller 2 rotates in the first direction of rotation. As the roller 2 rotates around the first axis of rotation AA, the pin 18 rotates around the first axis of rotation and slides along the slide 19 making the pin 18 move from the first pin position to the second pin position. Once the second pin position has been reached, the ratchet element 4*c* is in contact with the clamp 5 which finishes moving the member 4 to the second member position. Rotation of the roller 2 means that the first clamping area 5*a* is in contact with the second contact surface 4*a* which has the effect of blocking the roller 2.

In the second button position, the button 17 defines a slide 19 that intercepts the trajectory of the pin 18 which offsets the pin 18 so as to move the member 4 to the second member position thereby achieving clamping of the roller 2 independently from the speed of rotation of the roller 2. When the roller 2 makes a turn or less than a turn of the roller, the button 17 moves from the first member position to the second member position enabling the roller 2 to be blocked independently from the speed of rotation of the roller 2.

This solution is particularly advantageous as the same member 4 is used to block the roller 2 either when the speed of rotation of the roller 2 reaches the threshold speed or when the roller 2 makes a turn when the button 17 is moved to a clamping position of the roller 2.

In a particular embodiment, when the member 4 presses against the stop 9 of the roller 2, the slide 19 leaves the pin 18 so that the forces applied by the roller 2 against the clamp 5 are not transmitted to the slide 19.

It is advantageous for the button 17 to be mounted rotatable to move the slide 19.

The configuration illustrated in FIGS. 1 to 14 is advantageous as it has a reduced number of parts thereby reducing the failure rate risk.

The detection device of the speed of rotation of the roller 2 advantageously forms part of a fall arrester. The fall arrester can comprise a rope fitted in the support in contact with the roller 2. The fall arrester is configured to prevent the fall arrester from running along the rope at a linear speed that is higher than a threshold speed. As the rope is in contact with the roller 2, the running speed between the rope and the fall arrester corresponds to a speed of rotation of the roller 2. The wire element is made to run in the clamping device which makes the roller 2 rotate. When the speed of rotation of the roller 2 reaches the threshold speed of rotation, the roller 2 blocks.

In the illustrated embodiments, the roller 2 is configured to operate in conjunction with a rope of circular cross-section, but it is also possible to provide a roller 2 designed to operate in conjunction with a strap having a square or rectangular. cross-section. The detection device is particularly suitable for use in a clamping device for a wire element, in particular a rope, but it is also possible to provide for it to be used in an automatic winder.

The invention claimed is:

1. The clamping device of a wire element comprising:

a support defining a U-shaped groove;

a body mounted movable with respect to the support;

a first rotation shaft fixed to the body;

a roller mounted rotating around the first rotation shaft, the first rotation shaft defining a first axis of rotation for the roller, the roller having an additional groove designed to receive a wire element;

the U-shaped groove and the roller defining a ring designed for passage of a wire element having one wall formed by the roller so that sliding of the wire element in the ring causes rotation of the roller;

a clamp fixed to the body and having a first contact surface;

at least one member fixed to the roller so as to rotate around the first axis of rotation in an annular volume arranged between the first axis of rotation and the clamp, the at least one member having a second contact surface, the at least one member being mounted movable with respect to the first axis of rotation between a first member position in which a first distance between the first axis of rotation and a distal part of a second contact area is smaller than a second distance between the first axis of rotation and a proximal part of a first contact area and a second member position in which the first distance is larger than the second distance, rotation of the roller generating a centrifugal force designed to move the second contact surface away from the first axis of rotation to increase the value of the first distance so that the second contact surface is in contact with the first contact surface when the speed of rotation of the roller reaches a threshold speed of rotation, the clamp blocking one direction of rotation of the roller when the first contact surface is in contact with the second contact surface;

wherein the roller is hollow and the roller is provided with a stop mounted fixedly on the roller so that the stop rotates around the first axis of rotation, the stop having a fourth contact area arranged in the hollow;

wherein the clamp is located inside the roller and, in the second member position, the member is pressing on an inner side wall that delineates the hollow in the roller;

wherein the member is mounted rotatable around a second rotation shaft between the first member position and the second member position, the second rotation shaft being mounted fixedly on the roller;

wherein, in the second member position, a third contact area of the member is pressing on the fourth contact area, the third contact area being arranged opposite the second contact area;

wherein the member and the second rotation shaft define a functional clearance in a direction perpendicular to the axis of rotation of the roller to reduce the mechanical stress on the second rotation shaft.

2. The clamping device according to claim 1 wherein, in the second member position, the fourth contact area and the third contact area define a first plane that includes the first axis of rotation.

3. The clamping device according to claim 2 wherein, in the second member position, the first contact area and the second contact area define a second plane parallel to the first axis of rotation, the first plane being secant to the second plane, the contact between the third contact area and the fourth contact area being separated from the intersection between the first plane and the second plane by the first axis of rotation.

4. The clamping device according to claim 1 wherein the member has a flyweight portion and a ratchet element arranged one after the other in a direction parallel to the first axis of rotation, the ratchet element comprising the second contact surface;

and wherein the fourth contact area is formed at least by one of the ratchet element and the flyweight portion.

5. The clamping device according to claim 4 wherein the fourth contact area is formed by the ratchet element and by the flyweight portion.

6. The clamping device according to claim 1 wherein, in the second member position, the stop defines a complementary surface to the portion of the member that receives the second rotation shaft.

7. The method for clamping a wire element comprising the following steps:

providing a clamping device according to claim 1 and a wire element fitted in the clamping device in contact with the roller;

inserting the wire element in a ring of the clamping device;

making the wire element run inside the clamping device ring so as to make the roller rotate up to a threshold speed of rotation to block the roller and block the wire element inside the clamping device.

8. The clamping device according to claim 2 wherein the member has a flyweight portion and a ratchet element arranged one after the other in a direction parallel to the first axis of rotation, the ratchet element comprising the second contact surface;

and wherein the fourth contact area is formed at least by one of the ratchet element and the flyweight portion.

9. The clamping device according to claim 3 wherein the member has a flyweight portion and a ratchet element arranged one after the other in a direction parallel to the first axis of rotation, the ratchet element comprising the second contact surface;

and wherein the fourth contact area is formed at least by one of the ratchet element and the flyweight portion.

* * * * *